(12) United States Patent
Peng (10) Patent No.: US 12,167,162 B2
(45) Date of Patent: Dec. 10, 2024

(54) VIDEO DATA PROCESSING METHOD AND APPARATUS FOR BLENDING IMAGES INTO VIDEO DATA

(71) Applicant: SigmaStar Technology Ltd., Fujian (CN)

(72) Inventor: Peng Peng, Shenzhen (CN)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 378 days.

(21) Appl. No.: 17/585,732

(22) Filed: Jan. 27, 2022

(65) Prior Publication Data
US 2023/0084156 A1   Mar. 16, 2023

(30) Foreign Application Priority Data
Sep. 16, 2021   (CN) .......................... 202111088504.X (51) Int. Cl.
*H04N 5/265*   (2006.01)
*G06T 3/40*   (2006.01)

(52) U.S. Cl.
CPC ............... *H04N 5/265* (2013.01); *G06T 3/40* (2013.01)

(58) Field of Classification Search
USPC ........................................................ 382/298
See application file for complete search history.

(56) References Cited

U.S. PATENT DOCUMENTS

| | | | |
|---|---|---|---|
| 2009/0256968 A1* | 10/2009 | Matsunaka | H04N 5/46 348/E9.057 |
| 2010/0066762 A1* | 3/2010 | Yeh | H04N 5/44504 345/629 |
| 2017/0237998 A1* | 8/2017 | Shepherd | H04N 21/234381 375/240.25 |

* cited by examiner

*Primary Examiner* — Jacky X Zheng (74) *Attorney, Agent, or Firm* — Edell, Shapiro & Finnan, LLC (57) ABSTRACT

A video data processing apparatus provided according to one embodiment of the present invention includes a processor and a blending circuit. The processor provides a first set of parameters according to a first channel identification signal and a second set of parameters according to a second channel identification signal. The blending circuit blends a first image into first video data at a first timing according to the first set of parameters and a second image into second video data at a second timing according to the second set of parameters. A time difference between the first timing and the second timing is less than a frame period of the first video data.

16 Claims, 5 Drawing Sheets

VIDEO DATA PROCESSING METHOD AND APPARATUS FOR BLENDING IMAGES INTO VIDEO DATA

This application claims the benefit of China application Serial No. CN202111088504.X, filed on Sep. 16, 2021, the subject matter of which is incorporated herein by reference.

BACKGROUND OF THE INVENTION

Field of the Invention

The present invention relates to the field of video data processing, and more particularly to a processing method and apparatus for blending an image into video data.

Description of the Related Art

A frame buffer interface is an interface provided for a display device by the Linux system, and a user is allowed to directly perform reading and writing operations on a display buffer area through the interface for display on the display device. In an embedded Linux product, a bottom layer of graphics interfaces such as QT, Minigui, Android Surfaceflinger and DirectFb is connected to a frame buffer interface, and an associated hardware driver layer is controlled via the frame buffer interface to achieve functions including display and image blending.

In the Linux system, one frame buffer interface corresponds to one hardware unit via the hardware driver layer. For example, when image blending processing is performed via the frame buffer interface, one frame buffer interface corresponds to one blending circuit. Under such condition, one blending circuit is capable of only processing video data from one path, and if video data of multiple paths needs to be processed, several blending circuits are needed, hence resulting in significant increased hardware costs.

SUMMARY OF THE INVENTION

The video processing method and apparatus provided by the present invention are capable of blending different images into multiple sets of video data by means of time-division multiplexing hardware via software, so as to enhance image blending efficiency and hardware utilization efficiency.

A video data processing method is provided according to an embodiment of the present invention. The method includes: providing a look-up table (LUT), which includes correspondence between a first channel identification signal and a first set of parameters and correspondence between a second channel identification signal and a second set of parameters; searching the LUT according to the first channel identification signal so as to write the first set of parameters to a register of a blending circuit; blending a first image into first video data at a first timing according to the first set of parameters by the blending circuit; searching the LUT according to the second channel identification signal so as to write the second set of parameters to the register of the blending circuit; and blending a second image into second video data at a second timing according to the second set of parameters by the blending circuit; wherein, a time difference between the first timing and the second timing is less than a frame period of the first video data.

A video data processing apparatus provided according to another embodiment of the present invention includes a processor and a blending circuit. The processor provides a first set of parameters according to a first channel identification signal and a second set of parameters according to a second channel identification signal. The blending circuit blends a first image into first video data at a first timing according to the first set of parameters and a second image into second video data at a second timing according to the second set of parameters. A time difference between the first timing and the second timing is less than a frame period of the first video data.

BRIEF DESCRIPTION OF THE DRAWINGS

To better understand the technical solutions of the embodiments of the present invention, the embodiments are described in brief with the accompanying drawings below. It is obvious that the accompanying drawings in the description below provide merely some embodiments of the present invention, and a person skilled in the art could arrive at other embodiments on the basis of the accompanying drawings without involving inventive skills.

DETAILED DESCRIPTION OF THE INVENTION

The technical solutions of the embodiments of the disclosure are clearly and comprehensively described in combination with the accompanying drawings of the embodiments of the present invention below. It is obvious that the described embodiments represent merely some but not all possible embodiments. On the basis of the embodiments of the present, all other embodiments arrived by a person skilled in the art without involving inventive skills are to be encompassed within the scope of protection of the present invention.

Figure 1:
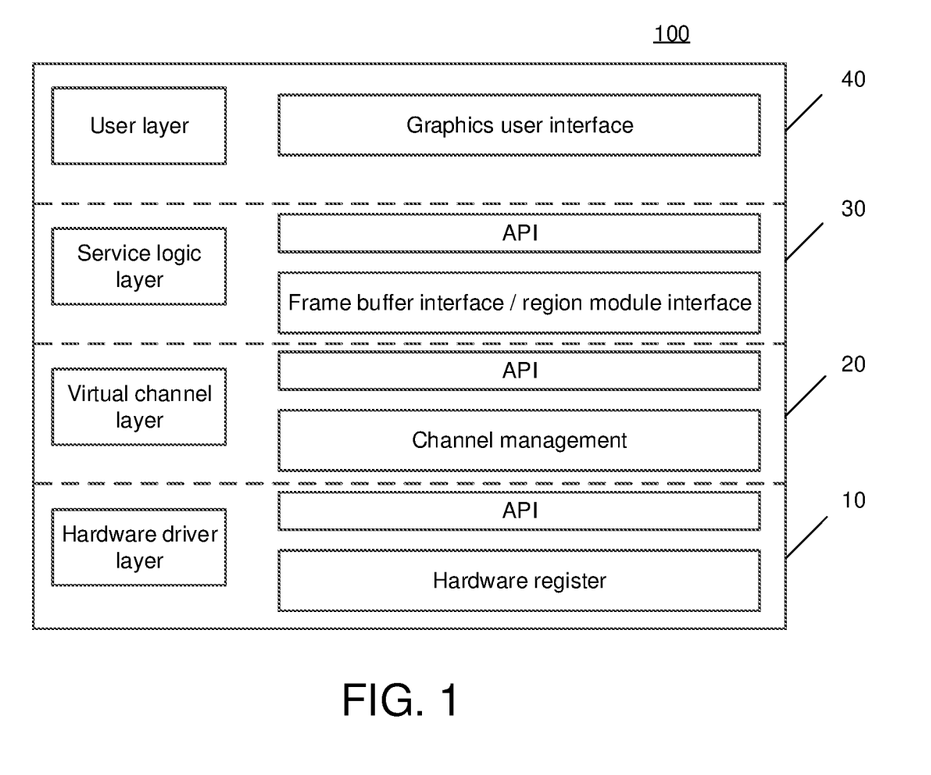
FIG. 1 is a schematic diagram of a software system structure provided according to an embodiment of the present invention.
Figure 2:
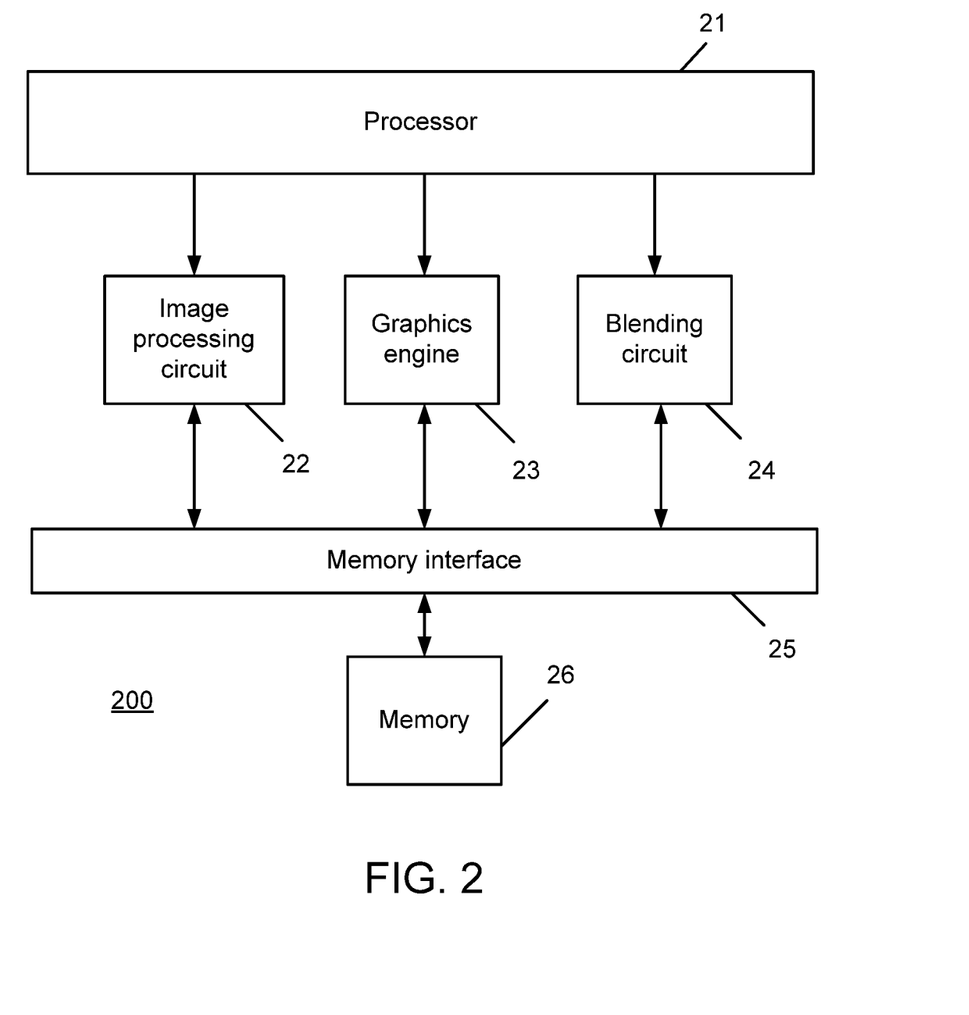
FIG. 2 is a block schematic diagram of a video data processing apparatus provided according to an embodiment of the present invention.

The present invention provides a software system structure and controls a hardware circuit by software via the software system structure, so as to achieve the object of processing multiple sets of video data by one hardware circuit by means of time-division multiplexing of a hardware circuit. Referring to FIG. 1, FIG. 1 shows a schematic diagram of a software system structure provided according to an embodiment of the present invention. As shown in FIG. 1, a software system structure 100 includes a hardware driver layer 10, a virtual channel layer 20, a service logic layer 30 and a user layer 40. The software system structure 100 is applicable to a video data processing apparatus. Referring to FIG. 2, FIG. 2 shows a block schematic diagram of a video data processing apparatus provided according to an embodiment of the present invention. The video data processing apparatus 200 includes a processor 21, an image processing circuit 22, a graphics engine 23, a blending circuit 24, a memory interface 25 and a memory 26. In the description below, an example in which the software system structure 100 is applied to the video data processing apparatus 200 is given to illustrate functions of the layers.

The hardware driver layer 10 is for setting configuration parameters of individual hardware elements to control operations of the hardware elements, wherein the hardware elements are, for example, the image processing circuit 22 and the blending circuit 24. In one embodiment, the hardware driver layer 10 sets the configuration parameters of the hardware elements into a register corresponding to the hardware elements. Taking the blending circuit 24 for example, the configuration parameters include a physical address of image data in the memory 26, and the size, format, display position and transparency of the image data, and these parameters may be used by an upper layer via an application programming interface (API).

The virtual channel layer 20 may set and manage configuration parameters of hardware using virtual channels, wherein each of the channels may correspond to one set of configuration parameters, and multiple channels may be used to provide multiple sets of different configuration parameters for the same hardware. For example, multiple sets of different configuration parameters are provided using multiple channels to the blending circuit 24. In one embodiment, the virtual channel layer 20 includes a look-up table (LUT), which includes correspondence and parameter data of channel numbers of individual channels and the corresponding configuration parameters. For example, the LUT includes information such as physical addresses of image data corresponding to the channels in the memory 26, the sizes, formats, display positions and transparency of image data, and sources of video data. In one embodiment, the LUT may further include correspondence between the channels and upper-layer frame buffer interfaces and/or region module interfaces. A software system of the video data processing apparatus 200 may use a channel number as a channel identification number, so as to search the LUT according to the channel numbers of the channels to obtain the corresponding configuration parameters and associated data.

One processing principle of multi-path video data is simultaneously processing video frames on different paths within a period (for example, one frame interval or one frame period) on the basis that the hardware processing speed is fast enough. Taking 30 frames per second (fps) video data for example, given that the time used by hardware to process data of one frame is less than 16 ms, two frames can then be processed within a period of 33 ms, and the number of paths of video data that can be processed increases as the processing speed gets faster. In a software system of the prior art, upper-layer application software directly uses an API of the hardware driver layer 10 to control the blending circuit 24 to blend one image into one path of video data. However, in simultaneous processing of multi-path video data, the blending circuit 24 is incapable of differentiating which set of video data needs to be blended or does not need to be blended with an image. Therefore, the concept of channel management is introduced in the present invention, and memory data and associated settings used by an image to be blended are managed by a virtual channel in a unit of channels, and are virtualized into an exclusive API for the use of an upper layer. With the virtual channel layer 20 provided, the video data processing apparatus 200 is enabled to perform image blending processing for multi-path video data within a time period of one frame interval or one frame period by using one blending circuit 24. In one embodiment, the hardware driver layer 10 determines, according to a channel identifier in data of a next video frame, the channel for which blending processing is to be performed each time it receives a synchronization signal $V_{SYNC}$, searches the LUT according to the channel number to obtain the configuration parameters associated with the channel, and writes the configuration parameters obtained into the register of the blending circuit 24 before the arrival of the next synchronization signal $V_{SYNC}$.

The service logic layer 30 includes two parts, one of which is a service logic of frame buffer interfaces of a standard Linux system and this sets the correspondence between the individual frame buffer interfaces and the individual channels in the virtual channel layer 20, and the other is a service logic associated with region module interfaces of the video data processing apparatus 200 and this sets the correspondence between the individual region module interfaces and the individual channels in the virtual channel layer 20. For example, frame buffer interface 1 (/dev/fb1) corresponds to channel 1, frame buffer interface 2 (/dev/fb2) corresponds to channel 2, and region module interface 1 (region 1) corresponds to channel 3. In one embodiment, the LUT in the virtual channel layer 20 may include settings associated with the hardware driver layer 10 for the individual frame buffer interfaces, the region module interfaces and the channels, and a user may set a default initialization state of the channels of the virtual channel layer 20 corresponding to the frame buffer interfaces via specific configuration files. When the software system of the video data processing apparatus 200 is in the initialization process, the correspondence among the individual frame buffer interfaces, the individual region module interfaces and the channels and associated settings are set via the API of the virtual channel layer 20.

The user layer 40 is for a user to call a software function and/or hardware element in the video data processing apparatus 20 so as to implement a specific application scenario. In one embodiment, the user layer 40 may blend a user interface (UI) on the video data via the frame buffer interface, and the user layer 40 may also implement an on-screen display (OSD) function by blending an image on the video data via the region module interface. With the virtual channel layer 20 provided, the software system structure 100 allows the user layer 40 to time-division multiplex multiple channels by software via the region module interface so as to blend an image into multi-path video data to perform display. Similarly, the user layer 40 can also display different contents on different channels by time-division multiplexing by software via the frame buffer interface.

Figure 3:
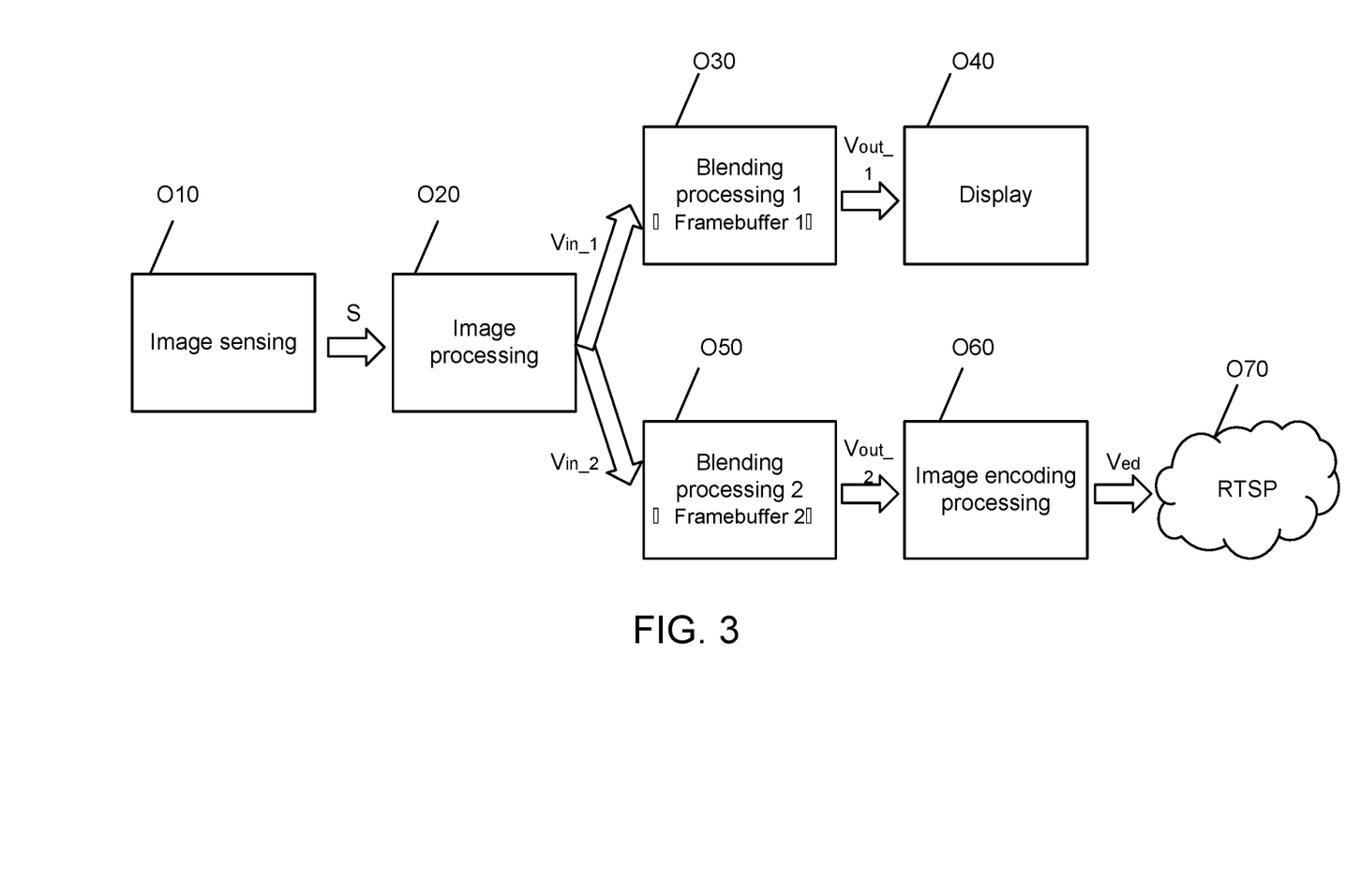
FIG. 3 is a schematic diagram of an application scenario according to an embodiment of the present invention.

Referring to FIG. 3, FIG. 3 shows a schematic diagram of an application scenario according to an embodiment of the present invention. How the video data processing device 200 with the software system structure 100 is used to implement the application scenario shown in FIG. 3 is described below.

Figure 4:
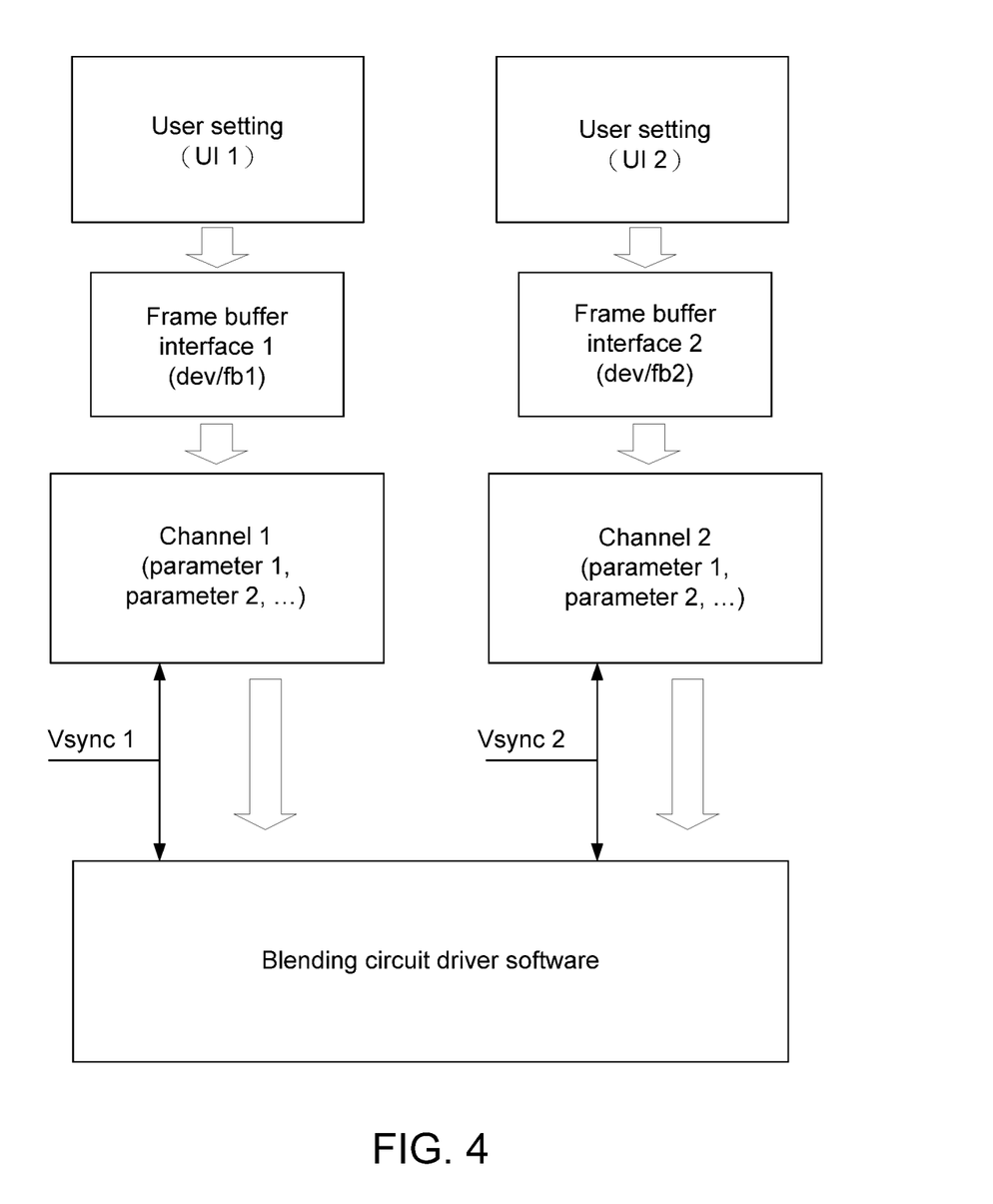
FIG. 4 is a schematic diagram of a software configuration for implementing the application scenario in FIG. 3.

Referring to FIG. 4, FIG. 4 shows a schematic diagram of a software configuration for implementing the application scenario in FIG. 3. As shown in FIG. 4, the software configuration of the system includes configuration parameters of channel 1 and channel 2, frame buffer interface 1 (/dev/fb1) corresponds to channel 1, frame buffer interface 2 (/dev/fb2) corresponds to channel 2, and the correspondence between the configuration parameters of channel 1 and channel 2 and frame buffer interface 1 and frame buffer interface 2 is recorded in the LUT of the virtual channel layer 20. An image UI_1 in the user layer 40 is blended using frame buffer interface 1, and an image UI_2 is blended using frame buffer interface 2. In this example, channel 1 is for blending the image UI_1 into video data $V_{in\_1}$, channel 2 is for blending the image UI_2 into video data $V_{in\_2}$, and the configuration parameters of channel 1 include information such as memory address and video size of the video data $V_{in\_1}$, the memory address, image size and format of the image UI_1, a blending position (for example, a starting address of blending the image UI_1 into the video data $V_{in\_1}$), and transparency. Moreover, the configuration parameters of channel 2 include information such as the memory address and video size of the video data $V_{in\_2}$, and the memory address, image size and format of the image UI_2. The configuration parameters and correspondence above may be configured via a configuration file during a software system initialization process. During operation, the processing order of channel 1 is before channel 2, and blending circuit driver software writes the configuration parameters corresponding to channel 1 into the register of the blending circuit 24 upon receiving a synchronization signal $V_{SYNC1}$. After the synchronization signal $V_{SYNC1}$, the blending circuit driver software writes the configuration parameters corresponding to channel 2 into the register of the blending circuit 24 upon receiving a synchronization signal $V_{SYNC2}$, and the blending circuit 24 accordingly completes the blending operation. In one embodiment, the synchronization signal $V_{SYNC1}$ and the synchronization signal $V_{SYNC2}$ may be frame synchronization signals of the video data $V_{in\_1}$ and/or video data $V_{in\_2}$, and are for instructing the blending circuit 24 to complete blending of one frame. In one embodiment, the synchronization signal $V_{SYNC1}$ and the synchronization signal $V_{SYNC2}$ are for instructing the video data processing apparatus 200 to complete displaying of one frame.

In one embodiment, the processor 21 executes a program code so as to run a software system having the software system structure 100. In operation S10, image sensing is performed by an image sensor (not shown) to obtain sensing data S. In this embodiment, the image sensor is disposed outside the video data processing apparatus 200 and is electrically connected to the video data processing device 200 via a connection interface, and the sensing data S is 30 fps image data in a 1920*1080 resolution. In operation O20, the image processing circuit 22 receives the sensing data S and performs image processing on the sensing data S to output the video data $V_{in\_1}$ and/or video data $V_{in\_2}$. In one embodiment, the image processing performed on the sensing data S by the image processing circuit 22 may include de-noising, brightness adjustment, color adjustment and image scaling. In this embodiment, the resolution of the video data $V_{in\_1}$ is 320*240, the resolution of the video data $V_{in\_2}$ is 1920*1080, and the image processing circuit 22 stores the video data $V_{in\_1}$ to the memory 26 according to the memory address allocated to the video data $V_{in\_1}$ in the software configuration, and stores the video data $V_{in\_2}$ according to the memory address allocated to the video data $V_{in\_2}$ in the software configuration.

In operation O30, the processor 21 controls the blending circuit 24 by blending circuit driver software in the hardware driver layer 10; when the blending circuit 24 of the blending circuit driver software receives the synchronization signal $V_{SYNC1}$ at a timing T0, the processor 21 determines according to the LUT of the virtual channel layer 20 that blending processing is to be next performed on channel 1, and the blending circuit driver software sets the configuration parameters corresponding to channel 1 into the register of the blending circuit 24 according to the LUT. As described above, channel 1 is for blending the image UI_1 into the video data $V_{in\_1}$, and the blending circuit 24 reads the video data $V_{in\_1}$ and the image UI_1 from the memory 26 according to the settings in the register and performs blending processing 1 so as to generate video data $V_{out\_1}$. In one embodiment, only when the blending circuit 24 or the blending circuit driver software receives the synchronization signal $V_{SYNC2}$, the blending circuit 24 then performs blending processing 1 of blending the image UI_1 into the video data $V_{in\_1}$, and the blending circuit 24 spends a processing time TP1 to complete blending processing 1. In one embodiment, before the blending circuit 24 performs blending processing 1, the graphics engine 23 performs rendering of the image UI_1, and stores the rendered image UI_1 in the memory 26. The image UI_1 is for displaying information such as time and electrical parameters, and a storage address of the image UI_1 in the memory 26 corresponds to the memory address of the image UI_1 in the LUT. In operation O40, the video data processing apparatus 200 outputs the video data $V_{out\_1}$ to a display device (not shown) for display.

In operation O50, when the blending circuit 24 of the blending circuit driver software receives the synchronization signal $V_{SYNC2}$ at a timing T1, the processor 21 determines according to the LUT of the virtual channel layer 20 that blending processing is to be next performed on channel 2, and the blending circuit driver software sets the configuration parameters corresponding to channel 2 into the register of the blending circuit 24 according to the LUT. As described above, channel 2 is for blending the image UI_2 into the video data $V_{in\_2}$, and the blending circuit 24 reads the video data $V_{in\_2}$ and the image UI_2 from the memory 26 according to the settings in the register and performs blending processing 2 so as to generate video data $V_{out\_2}$. In one embodiment, before the blending circuit 24 performs blending processing 2, the graphics engine 23 performs rendering of the image UI_2, and stores the rendered image UI_2 in the memory 26. The image UI_2 is for displaying information such as time and electrical parameters, and a storage address of the image UI_2 in the memory 26 corresponds to the memory address of the image UI_2 in the LUT. In one embodiment, the synchronization signal $V_{SYNC2}$ is for triggering the blending circuit 24 to perform blending processing 1 of blending the image UI_1 into the video data $V_{in\_1}$ at the timing T1, the blending circuit 24 of the blending circuit driver software receives a synchronization signal $V_{SINC3}$ at a timing T2, the synchronization signal $V_{SINC3}$ is for triggering blending circuit 24 to perform blending processing 2 of blending the image UI_2 into the video data $V_{in\_2}$, and the blending circuit 24 spends a processing time TP2 to complete blending processing 2; that is to say, the blending circuit driver software sets the configuration parameters corresponding to channel 2 into the register of the blending circuit 24 while the blending circuit 24 performs blending processing 1. Through the mechanism above, when the blending circuit 24 completes blending processing 1 of blending the image UI_1 into the video data $V_{in\_1}$, blending processing 2 of blending of the image UI_2 into the video data $V_{in\_2}$ can be immediately performed without waiting for the time of setting the configuration parameters of channel 2 into the register of the blending circuit 24.

In one embodiment, both the video data $V_{in\_1}$ and $V_{in\_2}$ are 30 fps images, the frame display period or an interval between two adjacent frames of the video data $V_{in\_1}$ is 33 ms, and similarly, the frame display period or an interval between two adjacent frames of the video data $V_{in\_2}$ is also 33 ms. The performance of the blending circuit 24 needs to satisfy the requirement that the processing time TP1 plus the processing time TP2 is less than 33 ms, and a time difference between the timing T2 and the timing T1 also needs to be less than 33 ms; in a preferred embodiment, the time difference between the timing T2 and the timing T1 is less than 16.5 ms (that is, a half of the interval between two adjacent frames). In the present invention, the virtual channel layer 20 is provided in the software system, channel 1 and channel 2 respectively correspond to two sets of configuration parameters, and the blending circuit 24 having better processing performance is used. Thus, by time-division multiplexing the blending circuit 24 via software, an application of processing two paths of video data (for example, the video data $V_{in\_1}$ and the video data $V_{in\_2}$ in the embodiment) using the same blending circuit is achieved.

In operation O60, the video data processing apparatus 200 performs encoding processing on the video data $V_{out\_2}$ by an encoder (not shown) to generate encoded data $V_{ed}$. The encoding processing is, for example, image encoding processing according to the video encoding standard H.264 or H.265. In operation O70, the video data processing apparatus transmits the encoded data $V_{ed}$ by a transmission interface (not shown). In one embodiment, the transmission interface transmits the encoded data $V_{ed}$ according to the real time streaming protocol (RTSP).

Figure 5:
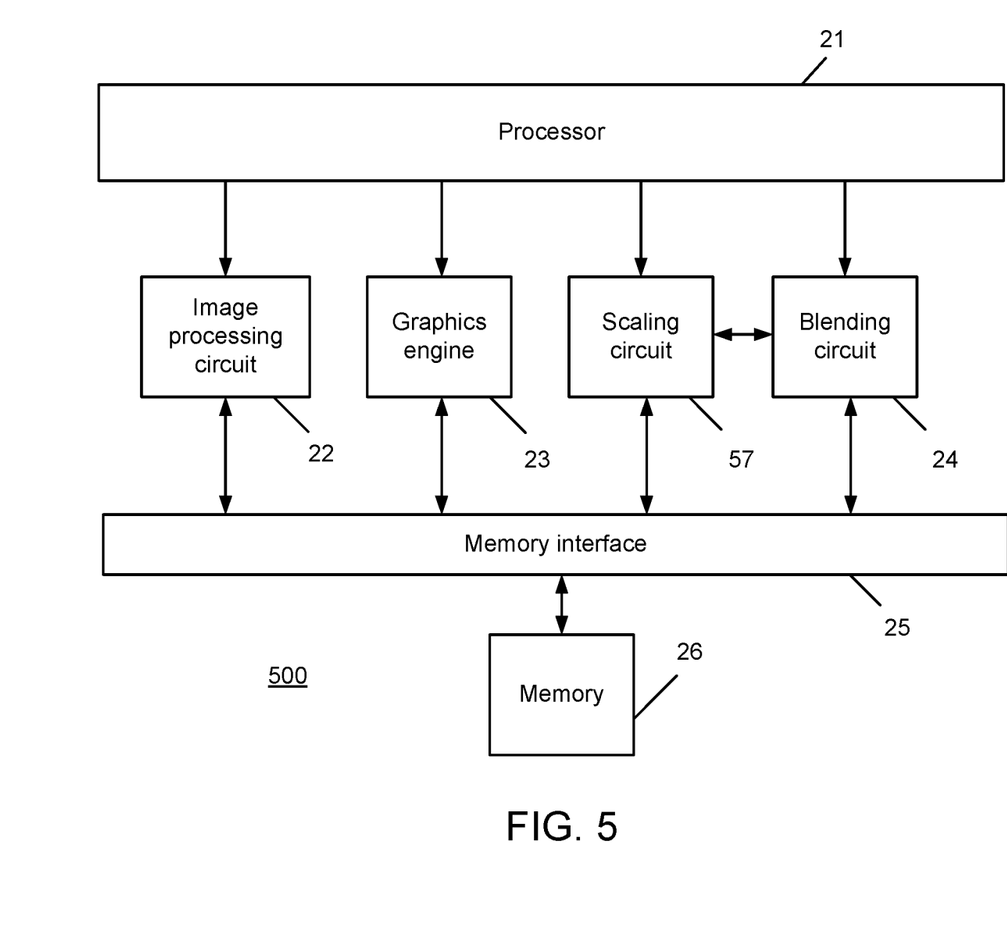
FIG. 5 is a block schematic diagram of a video data processing apparatus provided according to another embodiment of the present invention.

Referring to FIG. 5, FIG. 5 shows a block schematic diagram of a video data processing apparatus provided according to another embodiment of the present invention. Compared to the video data processing apparatus 200 in FIG. 2, a video data processing apparatus 500 further includes a scaling circuit 57. The scaling circuit 57 is arranged before the blending circuit 24. When the software system structure 100 is applied to a scenario of the video data processing apparatus 500, in addition to providing multiple sets of different configuration parameters to the blending circuit 24 by multiple channels, the virtual channel layer 20 further provides multiple sets of different configuration parameters to the scaling circuit 57 by the multiple channels. In one embodiment, the LUT in the virtual channel layer 20 includes correspondence and parameter data between channel numbers of individual channels and the configuration parameters corresponding to the scaling circuit 57, and correspondence and parameter data between channel numbers of individual channels and the configuration parameters corresponding the blending circuit 24. For example, the LUT in the software configuration in FIG. 4 may further include configuration parameters of channel 1 corresponding to the scaling circuit 57 for controlling the scaling circuit 57 to perform scaling processing on the video data $V_{in\_1}$, and the LUT further includes configuration parameters of channel 2 corresponding to the scaling circuit 57 for controlling the scaling circuit 57 to perform scaling processing on the video data $V_{in\_2}$. During operation, the hardware driver layer 10 writes the configuration parameters corresponding to channel 1 into respective registers of the scaling circuit 57 and the blending circuit 24 upon receiving a synchronization signal $V_{SYNC1}$. The scaling circuit 57 performs scaling processing on the video data $V_{in\_1}$ and outputs processed video data to the blending circuit 24 for blending processing. After the synchronization signal $V_{SYNC1}$, the hardware driver layer 10 writes the configuration parameters corresponding to channel 2 into the respective registers of the scaling circuit 57 and the blending circuit 24 upon receiving a synchronization signal $V_{SYNC2}$. Accordingly, the scaling circuit 57 performs scaling processing on the video data $V_{in\_2}$ and outputs processed video data to the blending circuit 24 for blending processing. The performance of the scaling circuit 57 needs to satisfy completion of scaling processing on the video data $V_{in\_1}$ and the video data $V_{in\_2}$ within a time interval between two adjacent frames. In a preferred embodiment, the total time of the time needed for the scaling circuit 57 to complete the scaling processing of the video data $V_{in\_1}$ and the video data $V_{in\_2}$ plus the time need for the blending circuit 24 to complete blending processing 1 and blending processing 2 is less than the time interval between two adjacent frames (33 ms in this example).

The embodiments in FIG. 3 and FIG. 4 illustrate that the software system and the video data processing apparatus of the present invention are capable of processing two paths of video data by time-division multiplexing the same blending circuit via software, and under a condition with adequate hardware performance, the software system and the video data processing apparatus of the present invention may further processes more than two paths of video data by time-division multiplexing the same blending circuit via software. In the embodiments in FIG. 3 and FIG. 4, both channel 1 and channel 2 corresponding to the frame buffer interface are given as an example for illustrations. In practice, the individual channels may selectively correspond to the frame buffer interfaces or the region module interfaces.

In conclusion, in the software system and the video data processing apparatus of the present invention, the virtual channel layer 20 is provided in the software structure, so as to blend contents corresponding to different buffer interfaces and/or region module interfaces on multi-path video data by time-division multiplexing a hardware circuit via software, thereby significantly enhancing hardware utilization rate as well as achieving display of OSD/UI in multiple windows.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded with the broadest interpretation so as to encompass all such modifications and similar arrangements and procedures.

What is claimed is:

1. A video data processing method, comprising:
providing a look-up table (LUT), the LUT comprising correspondence between a first channel identification signal and a first set of parameters and correspondence between a second channel identification signal and a second set of parameters;
searching the LUT according to the first channel identification signal to write the first set of parameters into a register of a blending circuit;
blending a first image into first video data at a first timing according to the first set of parameters by the blending circuit;
searching the LUT according to the second channel identification signal to write the second set of parameters into the register of the blending circuit; and
blending a second image into second video data at a second timing according to the second set of parameters by the blending circuit;
wherein a time difference between the first timing and the second timing is less than a frame period of the first video data.

2. The video data processing method according to claim 1, wherein the blending circuit spends a first processing time to blend the first image into the first video data and spends a second processing time to blend the second image into the second video data, wherein a total of the first processing time and the second processing time is less than the frame period.

3. The video data processing method according to claim 1, wherein the second set of parameters are written into the register of the blending circuit while the blending circuit performs an operation of blending the first image into the first video data.

4. The video data processing method according to claim 1, wherein the LUT further comprises correspondence between the first channel identification signal and a first frame buffer interface in a Linux system.

5. The video data processing method according to claim 1, wherein the LUT is disposed in a virtual channel layer of software, and the virtual channel layer is disposed between a service logic layer and a hardware driver layer of the software.

6. The video data processing method according to claim 1, wherein the first set of parameters comprise a position of the first image in a memory, a size of the first image, and a starting position for blending the first image into the first video data.

7. The video data processing method according to claim 1, wherein the first timing corresponds to a first frame synchronization signal, and the second timing corresponds to a second frame synchronization signal.

8. A video data processing apparatus, comprising:
   a processor, searching a look-up table (LTU) according to a first channel identification signal to obtain a first set of parameters and searching the LUT according to a second channel identification signal to obtain a second set of parameters; and
   a blending circuit, blending a first image into first video data at a first timing according to the first set of parameters, and a second image into second video data at a second timing according to the second set of parameters;
   wherein a time difference between the first timing and the second timing is less than a frame period of the first video data;
   wherein the LUT comprises correspondence between the first channel identification signal and the first set of parameters and correspondence between the second channel identification signal and the second set of parameters; and
   wherein the processor writes the first set of parameters and the second set of parameters into a register of the blending circuit.

9. The video data processing apparatus according to claim 8, wherein the blending circuit spends a first processing time to blend the first image into the first video data and spends a second processing time to blend the second image into the second video data, wherein a total of the first processing time and the second processing time is less than the frame period.

10. The video data processing apparatus according to claim 8, wherein the processor writes the second set of parameters into the register of the blending circuit before the second timing.

11. The video data processing apparatus according to claim 8, wherein the first channel identification signal corresponds to a first frame buffer interface in a Linux system, and the second channel identification signal corresponds to a second frame buffer interface in the Linux system.

12. The video data processing apparatus according to claim 11, wherein the LUT further comprises correspondence among the first channel identification signal, the first frame buffer interface and the first set of parameters.

13. The video data processing apparatus according to claim 12, wherein the first set of parameters comprise a position of the first image in a memory, a size of the first image, and a starting position for blending the first image into the first video data.

14. The video data processing apparatus according to claim 8, wherein the first channel identification signal corresponds to a first frame buffer interface in a Linux system, and the second channel identification signal corresponds to a region module interface.

15. The video data processing apparatus according to claim 8, wherein the first timing corresponds to a first frame synchronization signal, and the second timing corresponds to a second frame synchronization signal.

16. The video data processing apparatus according to claim 8, further comprising:
   a scaling circuit, performing scaling processing on the first video data so as to output the processed first video data to the blending circuit;
   wherein, the first set of parameters comprise a parameter for controlling the scaling circuit.

\* \* \* \* \*